(12) United States Patent
Ehrensvärd

(10) Patent No.: US 10,177,816 B2
(45) Date of Patent: *Jan. 8, 2019

(54) DEVICES AND METHODS FOR IDENTIFICATION, AUTHENTICATION AND SIGNING PURPOSES

(71) Applicant: Yubico Inc., Palo Alto, CA (US)

(72) Inventor: Jakob Ehrensvärd, Palo Alto, CA (US)

(73) Assignee: Yubico AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,219

(22) Filed: Mar. 13, 2018

(65) Prior Publication Data

US 2018/0205416 A1  Jul. 19, 2018

Related U.S. Application Data

(63) Continuation of application No. 14/343,324, filed as application No. PCT/EP2012/067499 on Sep. 7, 2012, now Pat. No. 9,954,578.

(60) Provisional application No. 61/532,329, filed on Sep. 8, 2011, provisional application No. 61/556,307, filed on Nov. 7, 2011.

(51) Int. Cl.
*H04B 5/00* (2006.01)
*H04L 29/06* (2006.01)
*H04W 4/80* (2018.01)

(52) U.S. Cl.
CPC ....... *H04B 5/0031* (2013.01); *H04L 63/0492* (2013.01); *H04L 63/0838* (2013.01); *H04L 63/123* (2013.01); *H04W 4/80* (2018.02); *H04L 63/0853* (2013.01)

(58) Field of Classification Search
CPC combination set(s) only.
See application file for complete search history.

(56) References Cited

U.S. PATENT DOCUMENTS

| 4,799,258 A | 1/1989 | Davies |
| 5,604,801 A | 2/1997 | Dolan et al. |
| 5,778,071 A | 7/1998 | Caputo et al. |

(Continued)

FOREIGN PATENT DOCUMENTS

WO   WO 2010043974 A1 *   4/2010   ....... G06K 19/07336

OTHER PUBLICATIONS

United States Office Action, U.S. Appl. No. 14/343,324, dated Apr. 6, 2017, 16 pages.

(Continued)

*Primary Examiner* — Tuan H Nguyen
*Assistant Examiner* — Erica L Fleming-Hall
(74) *Attorney, Agent, or Firm* — Fenwick & West LLP

(57) ABSTRACT

It is presented a method, performed in a one time password, OTP, generating device. The OTP device comprises an NFC/RFID, Near Field Communication/Radio Frequency Identification, interface. The method comprises the steps of: upon the OTP generating device being inserted into the RF field, generating a new OTP code; formatting the OTP code into a static message; responding to interrogation requests from an RFID/NFC reader; and responding to read requests from the RFID/NFC reader with the OTP code being part of a message as if it were a static message, using standardized methods. A corresponding device OTP generating device is also presented.

20 Claims, 7 Drawing Sheets

(56) References Cited

U.S. PATENT DOCUMENTS

| | | | |
|---|---|---|---|
| 5,887,131 A | 3/1999 | Angelo | |
| 7,942,335 B2* | 5/2011 | Kim | G06F 21/31 235/375 |
| 7,973,607 B1 | 7/2011 | Ciaffi et al. | |
| 8,045,961 B2 | 10/2011 | Ayed et al. | |
| 8,478,195 B1* | 7/2013 | Hewinson | H04B 5/0031 235/379 |
| 8,590,030 B1* | 11/2013 | Pei | H04L 63/0838 726/9 |
| 8,739,277 B2 | 5/2014 | Muller | |
| 8,812,860 B1* | 8/2014 | Bray | G06F 21/34 713/182 |
| 8,997,191 B1* | 3/2015 | Stark | G06F 21/32 713/173 |
| 9,119,069 B1* | 8/2015 | Vipond | H04W 12/06 |
| 9,292,668 B1* | 3/2016 | Spangler | G06F 21/31 |
| 9,762,567 B2* | 9/2017 | Gunning | H04W 4/008 |
| 2003/0048173 A1 | 3/2003 | Shigematsu et al. | |
| 2004/0098596 A1 | 5/2004 | Elteto et al. | |
| 2006/0041759 A1* | 2/2006 | Kaliski, Jr. | G06F 21/31 713/184 |
| 2007/0011724 A1* | 1/2007 | Gonzalez | G06F 21/31 726/4 |
| 2007/0258594 A1* | 11/2007 | Sandhu | H04L 9/0825 380/277 |
| 2008/0072058 A1 | 3/2008 | Cedar et al. | |
| 2009/0104888 A1* | 4/2009 | Cox | G06F 21/31 455/410 |
| 2009/0193264 A1* | 7/2009 | Fedronic | G06F 21/31 713/184 |
| 2010/0150348 A1* | 6/2010 | Fairbanks | H04L 9/0863 380/255 |
| 2010/0151823 A1* | 6/2010 | Dagorn | H04L 63/0853 455/411 |
| 2010/0235637 A1* | 9/2010 | Lu | G06F 21/6263 713/168 |
| 2011/0070825 A1* | 3/2011 | Griffin | H04B 5/0031 455/41.1 |
| 2011/0078031 A1* | 3/2011 | Mardikar | G06Q 20/20 705/17 |
| 2011/0153496 A1 | 6/2011 | Royyuru | |
| 2011/0321146 A1* | 12/2011 | Vernon | G06F 21/35 726/7 |
| 2012/0001733 A1* | 1/2012 | Kousaka | H04W 4/00 340/10.1 |
| 2012/0052800 A1* | 3/2012 | Bona | G06K 19/06187 455/41.1 |
| 2012/0066504 A1* | 3/2012 | Hird | G06F 21/31 713/183 |
| 2012/0066749 A1 | 3/2012 | Taugbol et al. | |
| 2012/0131331 A1* | 5/2012 | Benson | H04L 9/0844 713/155 |
| 2012/0166338 A1* | 6/2012 | Agnelli | G06Q 20/40 705/44 |
| 2012/0185398 A1* | 7/2012 | Weis | G06Q 20/20 705/75 |
| 2012/0204245 A1* | 8/2012 | Ting | G06F 21/35 726/6 |
| 2012/0221859 A1 | 8/2012 | Marien | |
| 2012/0323717 A1* | 12/2012 | Kirsch | G06Q 20/0855 705/26.1 |
| 2014/0304509 A1* | 10/2014 | Ehrensvard | G06F 21/35 713/168 |
| 2015/0189505 A1* | 7/2015 | Marien | H04L 63/0838 380/270 |
| 2015/0319142 A1* | 11/2015 | Herberg | H04L 63/0428 713/171 |
| 2016/0224680 A1* | 8/2016 | Maynard, II | G06F 17/30011 |
| 2017/0085558 A1* | 3/2017 | Ibrahim | H04L 63/0838 |
| 2017/0206532 A1* | 7/2017 | Choi | G06Q 30/012 |

OTHER PUBLICATIONS

United States Office Action, U.S. Appl. No. 14/343,324, dated Nov. 18, 2016, 16 pages.

United States Office Action, U.S. Appl. No. 14/343,324, dated Jul. 5, 2016, 15 pages.

United States Office Action, U.S. Appl. No. 14/343,324, dated Dec. 2, 2015, 12 pages.

* cited by examiner

```
2011-07- 30 22.15.18   Payment

Would you like to pay $220.00
to Wilkinson's electronics,
New York City, account #
220-30184442-12 ?
```

```
2011-08- 01 08.22.03

Network login

Login to network via VPN,
username john_doe  hostname
vpn.acme.com ?
```

```
2011-08-02 16.30.47   Signature
```

DEVICES AND METHODS FOR IDENTIFICATION, AUTHENTICATION AND SIGNING PURPOSES

CROSS-REFERENCE TO RELATED APPLICATION

This application is a continuation of prior Application No. 14/343,324, having a § 371(c) date of Jul. 3, 2014, which was the National Stage of International Application No. PCT/EP2012/067499, filed Sep. 7, 2012, which claims the benefit of U.S. Provisional Application No. 61/532,329, filed Sep. 8, 2011, and U.S. Provisional Application No. 61/556,307, filed Nov. 7, 2011, which are hereby incorporated by reference in their entireties.

TECHNICAL FIELD

The embodiments herein relate to devices using Near Field Communication (NFC) for identification, authentication and signing purposes.

BACKGROUND

Radio Frequency Identification (RFID) technology is an alternative technology to optical barcodes, featuring additional functionality including not requiring light or line of sight during reading. Such tags can therefore be embedded into products or key fobs and be read even when dirty or scratched. In addition, RFID tags can store much more information, allowing more data to be conveyed than an optical code. Several RFID initiatives have joined forces under a common umbrella, known as Near Field Communication (NFC). NFC standards are defined by the Near Field Communication Forum, Inc. (NFC-forum), and all references herein are to their standards as updated per 2012-08-15 and freely available at their website.

U.S. Pat. No. 8,045,961B2 discloses a method for logging in for a client application with authentication of user data once a first device receives user data from second mobile device using NFC. Login information can be displayed on a screen on the device. Transactions are signed using common methods such as password, public key or a centralized service such as RADIUS.

SUMMARY

An object of embodiments herein is to provide an improved way of signing transactions than what is known in the art.

According to a first aspect, it is provided a method, performed in a one time password, OTP, generating device comprising an NFC/RFID, Near Field Communication/Radio Frequency Identification, interface. The method comprises the steps of: upon the OTP generating device being inserted into the RF field, generating a new OTP code; formatting the OTP code into a static message; responding to interrogation requests from an RFID/NFC reader; and responding to read requests from the RFID/NFC reader with the OTP code being part of a message as if it were a static message, using standardized methods, e.g. methods part of the RFID and/or NFC standards The static message may be unique at each time of invocation. Unique is here to be interpreted as new every time of invocation. Nevertheless, since the number of bits for the static message is finite, over an infinite amount of time, the static message could in theory be repeated.

The step of formatting the OTP code may comprise adding a fixed URL to the OTP code.

The step of formatting the OTP code may provide a static message formatted accordance with the NFC Data Exchange Format, NDEF, specification.

The step of generating the new OTP code may comprise using OATH, open authentication, according to RFC, request for comments, 4226.

The method may further comprise the steps, prior to the step of generating a new OTP code, of: receiving user input comprising a PIN; receiving user input comprising a challenge, such as "amount to pay"; and the step, after the step of generating a new OTP code, of: presenting the generated OTP code on a display of the OTP generating device.

The method may further comprise the steps of: receiving identification data identifying a transaction to be approved; receiving user input indicating approval of the transaction; processing the identification through a one-way compression algorithm resulting in a token; and digitally signing the result of the one-way compression, resulting in a signed token; and The step of responding to read requests may comprise sending the signed token to the RFID/NFC reader.

The method may further comprise the step, prior to the step of receiving user input, of: presenting the identification data to a user.

According to a second aspect, it is presented a one time password, OTP, generating device comprising an NFC/RFID, Near Field Communication/Radio Frequency Identification, interface. The OTP generating device is arranged to perform the steps of: upon the OTP generating device being inserted into the RF field, generating a new OTP code; formatting the OTP code into a static message; responding to interrogation requests from an RFID/NFC reader; and responding to read requests from the RFID/NFC reader with the OTP code being part of a message as if it were a static message, using standardized methods e.g. methods part of the RFID and/or NFC standards.

The OTP generation device may be a calculator-like device comprising a display.

The OTP generation device may be a calculator-like device comprising a keyboard.

The OTP generation device may be a USB, Universal Serial Bus, key fob or a smartcard supporting both a contact interface and an NFC/RFID interface.

The OTP generation device may be a cellular telephone or any other type of portable computer, comprising an integral NFC/RFID interface, working in the mode of tag emulation.

The NFC/RFID interface may be compatible with NFC forum type 2 tag specification.

Generally, all terms used in the claims are to be interpreted according to their ordinary meaning in the technical field, unless explicitly defined otherwise herein. All references to "a/an/the element, apparatus, component, step, etc." are to be interpreted openly as referring to at least one instance of the element, apparatus, component, step, etc., unless explicitly stated otherwise. The steps of any method disclosed herein do not have to be performed in the exact order disclosed, unless explicitly stated.

BRIEF DESCRIPTION OF THE DRAWINGS

The following detailed description of the embodiments herein is accompanied by drawings in order to make it more readily understandable. In the drawings.

Figure 1:
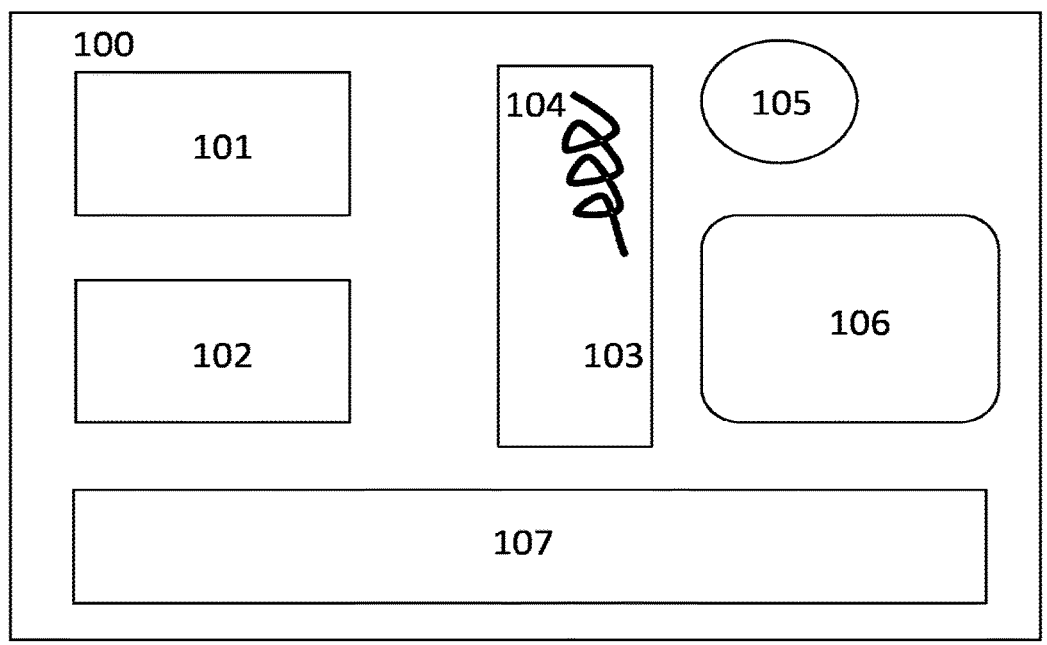
FIG. 1 shows schematically a device according to the embodiments herein.

The drawings are not necessarily to scale and the dimensions of certain features may have been exaggerated for the sake of clarity. Emphasis is instead placed upon illustrating the principle of the embodiments herein.

DETAILED DESCRIPTION

Non-limiting embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Recent years' spread of more advanced- and interactive mobile phones and other mobile devices have created use cases where external information can be automatically read into the phone from an external source, such as a barcode. With the inclusion of cameras in mobile phones, more advanced and dense barcodes, such as the QR-code have become ubiquitous. These codes now often hold a complete address to a web site on the Internet, known as a Unified Resource Identifier (URI) or Unified Resource Locator (URL). The terms URI and URL are used as interchangeable synonyms in this description; the skilled person will appreciate that all URLs are URIs. The definitions are as in RFC 3986 from The Internet Society, January 2005. By simply scanning such a barcode, the user can be automatically directed to a service where a web browser is automatically launched, using the scanned URL as the start page.

A URI may also hold part of or the complete code to a page. Thus it is possible to store most of, or the complete page, in the URI, and e.g. only load from the network parts of the code, such as login information.

Where the NFC forum have presented ways to standardize the exchange and interpretation of information from a static Radio-frequency identification (RFID) tag, these initiatives typically rely on very basic use cases, such as i) reading out a fixed uniform resource locator (URL) from an RFID tag in clear text and use this information to automatically launch a web browser application. The URL then directs the user to a web page and the desired content is displayed; or ii) replacing the optical product barcode where a piece of static information is read. Whereas the printed optical barcode is static by nature, the RFID technology allows information to change over the lifetime of the product.

One standard that has evolved over the years is the NFC Data Exchange Format (NDEF), which defines "out of the box" behavior in NFC environments.

Where the use cases in the standard define certain basic scenarios, it would be desired to provide a more advanced functionality for identification and authentication using NFC devices that fit into the current NDEF infrastructure.

Example A.3 of NFCForum-TS-RTD_URI_1.0, July 2006 from NFC Forum shows how to store a proprietary URI on a tag. This can then be transmitted over NFC, and be used for opening a web page.

However none of these disclosures allows for a user friendly login of a preselected service, with authentication.

It is also to be desired a solution that allows rapid and convenient transaction signing at a low cost, which works for mobile devices.

With the growth of Internet based transaction services, trust and user acceptance has become an increasingly complex problem, ultimately undermining the confidence in web based services.

The problem is likely to escalate even further as more transactions are being performed from applications in mobile telephones.

One problem can be described by a transaction process where a bank customer has entered a payment of a specific amount to a named recipient. The user then typically enters a final approval and the transaction is then completed. This setting relies on the assumption that what the customer sees on the screen (and then approves) is the same information that then actually is used to complete the transaction. If on the other hand a Trojan or rouge middle-man changes the information that is displayed to the user and what is sent to the bank in such a way that the user approves something else than what is actually sent, various forms of fraud can be performed.

A typical counteraction is to use an "authentication token" in the form of a calculator-like device where the user enters some information specific to the transaction on a keypad on the device. A cryptographic operation involving a cryptographic key is then performed on this information and a part of the result is then displayed on the screen of the device. The user then enters this information as a part of the transaction approval process. The service backend can use this "signature" to verify that the transaction is valid and authentic. As the fraudster is not in the possession of the cryptographic key, a valid signature can then not be fabricated to successfully perform a fraudulent transaction.

Although this scheme adds a considerable level of security for transaction based systems, it is cumbersome for the user, where it at the same time has to be a compromise not to become too burdening. In a banking process, typically just the total amount has to be entered and a truncated part of the cryptographic result is used, which opens up for various forms of attacks. However, requiring a complete entry of all recipients and transaction amounts would make it too awkward to use.

For more complex transactions, it sometimes does not work with such compromises in terms of truncation, thereby making these authentication devices unusable. Then, a trusted external "terminal" with a display can be used, often in conjunction with a Smartcard. The key transaction data is then transferred using a physical interface, such as a USB connection. By natural means, such a setting becomes expensive and somewhat complex. It furthermore does not work particularly well with mobile devices, such as phones.

NFC Signature Record Type Definition (RTD) Technical Specification from NFC forum dated 2010 Nov. 18 describes the format a signature can have in an RFC message.

An object of embodiments herein is therefore to provide an improved way of identification and authentication of a user with respect to a service provider by means of a device. This is the first aspect of the embodiments. Then a second aspect provides for an improved way for the user to sign a transaction by use of the same device.

According to the first aspect, the object is achieved by a method to create and convey a One Time Password (OTP) which can be converted and formatted in such a way that it can be read as a static string via NFC (thus the device is an RFID/NFC enabled device), where that string is being unique at each time of invocation. There is also an RFID/NFC reader, that could be a personal computing device such as a smart phone, laptop, PC, pad or tab accessing a website or information stored on the computing device, or it could be another sensor or system such as an admission control system.

Typical low-cost RFID tags comprise a simple memory array that can be read. The memory array is then initialized prior to deployment with a fixed string that typically never changes over the lifetime of the tag.

According to the second aspect, there is a small self-contained device featuring a display, a contactless interface and a cryptographic processor. The device and method for using it is based on the established infrastructure where static RFID tags is used to provide functionality for identification and authentication. The device receives a piece of identification data which can be of any type, e.g. text, numerical digits, timestamp, barcode, bitmap, logotype, handwritten signature etc., that identifies a transaction to be approved by the holder of the device. The information typically originates from a host application running remotely in a network setting. The information is displayed on the display, the user reads it and confirms e.g. by the use of a button or a keypad.

The received information passes through a one-way compression (hashing) algorithm, resulting in a token. The fixed length result (i.e. token) is then signed using a suitable digital signature generation, for example that of the first aspect—or by message authentication algorithm using a secret cryptographic key, which results in a signed token. The result is sent back from the device via the RFID/NFC reader and is routed back to the host application. The host application verifies the cryptographic result to determine if the transaction is authentic and therefore shall be approved or rejected Embodiments herein afford many advantages, of which a non-exhaustive list of examples follows:
  An advantage of the embodiments herein is that the OTP that is used for authentication is generated by inserting the device into the RF field generated by the RFID/NFC reader, and then is transferred as a static message using standardized methods, e.g. methods part of the RFID and/or NFC standards.
  Another advantage of the embodiments herein is that the user can sign the actual information from the service provider as seen on the screen of the device and that both parties thus have proof in terms of the hash value of what was signed.
  An important advantage is that the cryptographic information required to perform the cryptographic operation(s) on the input data are all separated from the potentially compromised terminal. All cryptographic processing is performed in a tamper-resistant device which does not "leak" any sensitive information.
  Today's users tend to use a larger diversity of devices when performing sensitive operations such as banking compared with some ten years ago. By keeping the security critical information in a separate device, the same credentials and cryptographic keys can be used on a variety of devices.

Secure distribution and storage of cryptographic keys is also a complex problem, which is elegantly solved by having an external device holding these entities.

The present embodiments disclose an OTP generation device, comprising an NFC/RFID tag-mode interface, said device being used in an identification- and authentication transaction process between a device holder and a service over the Internet. The device further comprises components for it to be used with a standardized NFC protocol, such as ISO14443, where standardized off-the-shelf interrogator can be used to exchange data with the device. In FIG. 1 the OTP generation device 100 can be a common calculator-like device, typically comprising a display 106. The device can optionally have a keyboard 107 or simple keypad to input data, related to the transaction to be performed. Independent of which, the scheme would then consider the OTP to be the value displayed on the device's screen 106.

In a different embodiment, the device does not have a display or input device. Such a device could be a standard ISO7816 type dual-interface (contact+NFC/RFID) smart-card or a USB key fob, providing the same functionality in a different form factor.

In yet another embodiment, the device could be a cellular telephone or any other type of portable computer, comprising an integral NFC/RFID interface, working in the mode of tag emulation, for example as specified in the NFC forum specifications.

This enhanced functionality allows the OTP generation device to be used in a normal setting, without NFC as well as providing the ability to be quickly and conveniently scanned by for example an NFC enabled cellular telephone. In that case, the user will be automatically connected, identified and authenticated in one simple step.

Independent of the embodiments described above, embodiments presented herein rely on the ability to create an OTP which can be formatted into a static message. Optional static data, such a fixed URL, can be added to this data.

The described OTP scheme could for example be OATH as described in RFC4226, but it should be obvious to a person of ordinary skill in the art, in light of the present disclosure, will recognize that the present technological advancement may be implemented in a manner different from the non-limiting embodiments discussed above.

The present embodiments describes, as shown schematically in FIG. 1, a more advanced OTP generating device 100, featuring a microprocessor 101, memory 102 and a NFC tag-mode subsystem 103 having a coil antenna 104. The tag-mode subsystem 103 can thus be a NFC/RFID interface. The tag device can either be powered by a battery 105 or by harvesting of energy induced in the NFC antenna 104. The device may also feature display 106 and input device in the form of a keypad 107. A touch screen could be used to combine the display and the keypad, and other types of input and output devices could be used, based on visual, audio or tactile response. There is a data bus, not shown, to connect the microprocessor 101, the NFC subsystem 103, and the input and output devices 106 and 107. There is also a system for power, including battery 105 or the antenna 104 for use of inductive power. Many housings and form factors are possible, all well known to the skilled person. Common form factors are in the shape of credit cards or key fobs.

The OTP generating device 100 features functionality programmed in the microprocessor 101 to generate One Time Passwords (OTPs). An OTP is a password that changes every time it is requested to avoid passwords to be harvested and re-used again. The OTP changes by a cryptographic algorithm operating on a cryptographic key stored in the device. A corresponding key is held by the party verifying the OTPs, whereas an adversary who is not in the possession of that key cannot generate OTPs nor verify correct ones generated by the device.

Figure 2:
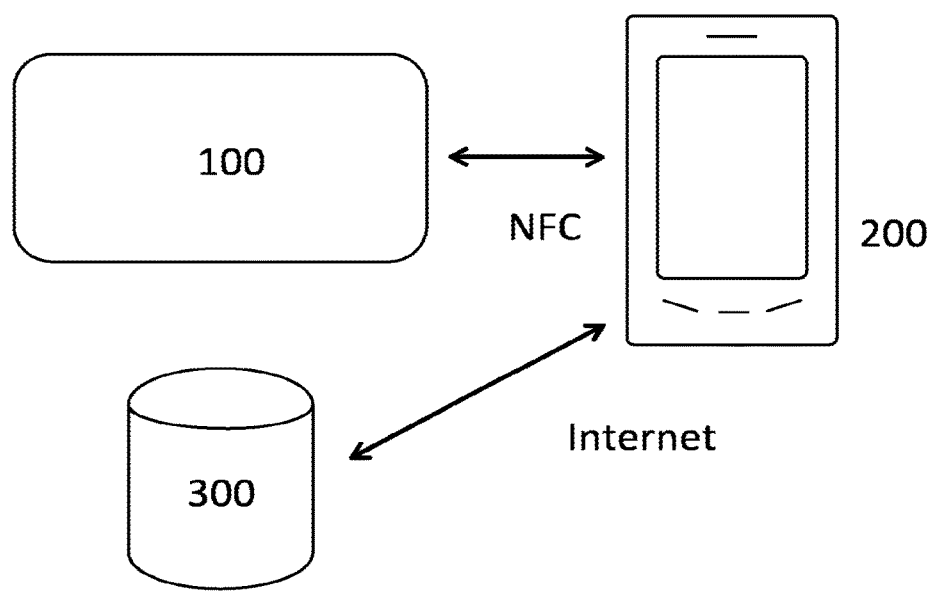
FIG. 2 shows an example of the device in use in connection with the embodiments herein.

In one embodiment, shown in FIG. 2, a cellular phone 200 equipped with an NFC reader interface is used. The cellular phone is further capable of reading NDEF tags from a OTP generating device 100 and has the ability to automatically invoke a pre-defined application when a NFC tag has been successfully read. An example of such a cellular phone is the Google Nexus S.

In a preferred embodiment, a standardized and widely used OTP scheme is used, such as OATH, defined by the standard RFC4226. An 8 digit numerical code is used for the OTP.

The OTP generating device 100 comprises a microprocessor 101 capable of performing cryptographic operations and non-volatile memory 102, capable of storing cryptographic data and information about the holder of the device as well as information how to access at least one remote service, e.g. on a server 300, over the Internet.

In one embodiment, the device further comprises a display 106 and a keypad 107 to allow interaction with a user, where intermediate steps of the authentication process are performed. In this embodiment, the device further comprises time-keeper powered by a battery 105, preferably a small coin-sized battery of Lithium-Manganese type.

Figure 7:
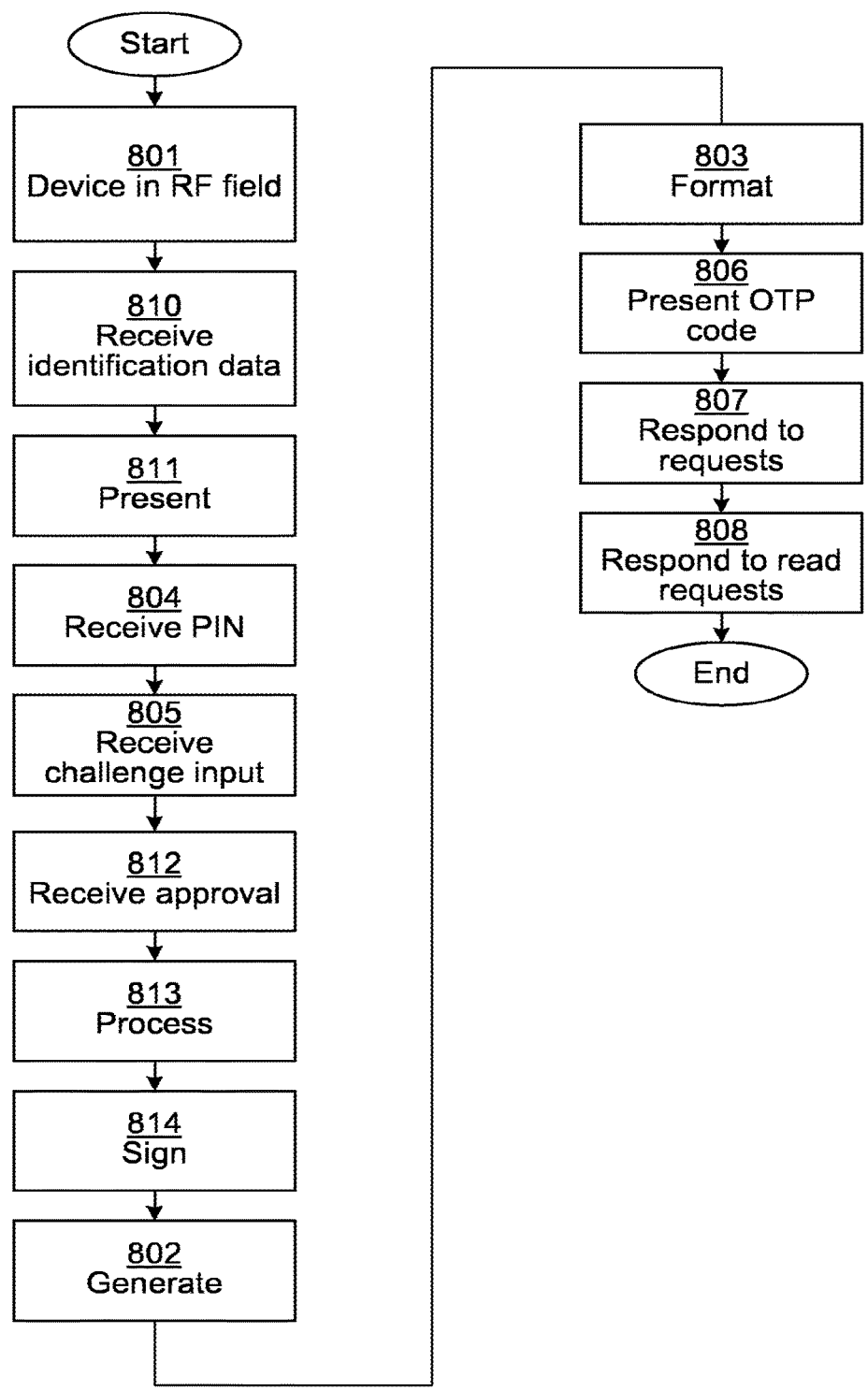
FIG. 7 illustrates is a flow chart illustrating a method according to one embodiment, executed in an OTP generating device comprising an NFC/RFID interface.

FIG. 7 illustrates is a flow chart illustrating a method according to one embodiment, executed in an OTP generating device comprising an NFC/RFID interface. General steps involved are:

801 The OTP generating device 100 is inserted into the RF field (generated by the RFID/NFC reader)

802 A new OTP code is generated. This step may include incrementing a counter and/or capturing the current time to make the code time-variant.

803 The OTP code is formatted into a static message with appropriate additional information to allow the message to be interpreted by the reader. The message is then buffered to allow it to be read with zero (or negligible) delay if requested by the RFID/NFC reader.

807 The RFID/NFC device responds to interrogation requests generated by the reader.

808 The RFID/NFC reader reads the OTP formatted in step 3 as if it was a static message, using standardized methods e.g. methods part of the RFID and/or NFC standards.

Optionally there are further steps, prior to the step of generating a new OTP code, of:

804 receiving user input comprising a PIN
805 receiving user input comprising a challenge, such as "amount to pay"

and a step, after the step of generating a new OTP code, of:

806 presenting the generated OTP code on a display of the OTP generating device.

Also, optionally, the following steps are included, prior to the step of responding to requests:

810 receiving identification data identifying a transaction to be approved;
812 receiving user input indicating approval of the transaction;
813 processing the identification through a one-way compression algorithm resulting in a token;
814 digitally signing the result of the one-way compression, resulting in a signed token; and In this situation, the step 808 of responding to read requests comprises sending the signed token to the RFID/NFC reader.

An OTP can either be generated by an explicit command of the device holder or implicitly by interrogating the device using an NFC reader.

Steps involved where the holder explicitly generates an OTP and a traditional login process is performed 1. The user turns on the device and enters a PIN on the device keypad 107 to verify that the user is the legitimate owner of the device. If the entered PIN is invalid, the operation is terminated and the device shuts down.
2. An OTP is generated and the result is shown on the device display 106
3. A pre-configured service URL is stored in the device by the issuer. This URL is concatenated with the generated OTP and the resulting URL is then formatted into a NDEF URI message, which is stored in the NFC subsystem tag memory.
4. The device is scanned using a NFC reader device (that could be on a smart phone 200 or a PC), which detects that the tag device holds a NDEF URI message
5. The URI NDEF message is retrieved and the reader 200 then automatically launches a web browser and navigates to the location specified by the URI 300.
6. The user is presented with a login screen, where a device username and password is entered manually by the user
7. The web server 300 uses the OTP tag conveyed through the URI together with the supplied username and password to determine if the user shall be given access to the requested service.

Steps involved where an OTP is implicitly generated and an expedited login procedure is used 1. The OTP generating device 100 is inserted into the activation field of the NFC reader 200. The RF field should be strong enough to power a device that does not have a battery
2. The presence of a RF field together with the presence of the NFC reader modulation causes the OTP generating device 100 to generate an OTP instantaneously.
3. A pre-configured service URL and a device holder identification string are stored in the device by the issuer. This URL is concatenated with the identification string and the generated OTP and the resulting URL is then formatted into a NDEF URI message, which is stored in the NFC subsystem 103 tag memory.
4. The device responds to the NFC reader activation- and read requests and the NDEF message is passed over from the OTP generating device 100 to the reader 200.
5. The URI NDEF message is retrieved and the reader then automatically launches a web browser and navigates to the location specified by the URI 300.
6. The web server 300 uses the OTP- and identification tags conveyed through the URI to determine if the user shall be given access to the requested service.

In another embodiment the pre-configured URI contains code for displaying most of the webpage, and only parts relevant for login are retrieved by concatenation with the generated OTP.

Another embodiment is to provide ways to address the growing concerns of malign code covertly modifying information in a transaction process to perform fraudulent transactions. One example is where a destination account number in a payment process is modified so the actual payment goes to a different account than user believes. With a virus/Trojan infected computer, this is very difficult to detect.

By utilizing the NFC interface to convey information about the transaction to be performed to the device and displaying it on the display, the user will see in clear text what is actually being performed. This information can then be included in the cryptographic authentication operation so any attempt to modify the transaction data will cause the transaction authentication to fail, thereby aborting the fraudulent action.

It should be obvious to anyone skilled in the art that several variants of the schemes described above can be implemented, still based on the general principles of embodiments presented herein.

Assuming a first example of invocation implementation, the data used will be.
Static data:
http://www.acme.com/?id=4711&otp=
Dynamic OTP generated:
02347102
Static data presented:
http://www.acme.com/?id=4711&otp=02347102

A second invocation example, including removal from and reinsertion of the device to the RF field could then generate:
Static data:
http://www.acme.com/?id=4711&otp=
Dynamic OTP generated:
92184479
Static data presented:
http://www.acme.com/?id=4711&otp=92184479

A third invocation example, including removal from and reinsertion of the device to the RF field could then generate:
Static data:
http://www.acme.com/?id=4711&otp=
Dynamic OTP generated:
39214713
Static data presented:
http://www.acme.com/?id=4711&otp=39214713

Obviously, the encoding of the identity and OTP is not limited to being arguments in the URL string. In order to shorten the string the identity and arguments can be compressed with a scheme such as Base64. A set of generated URLs could then look like:
http://www.acme.com/cxMTEyMz
http://www.acme.com/cxMTMyOD
http://www.acme.com/cxMTAzMT
Or
http://www.acme.com/johndoe/02347102
http://www.acme.com/johndoe/92184479
http://www.acme.com/johndoe/39214713

The benefit provided by the schemes described above is that not only information for navigation is provided, but also that information for identification and authentication goes with this URL.

For simplicity, the NFC/RFID interface should be compatible with the NFC forum type 2 tag specification. By encoding and formatting the URL strings in accordance with the NDEF specification, the default behavior when a device is used with a NDEF compliant reader then becomes fully automatic and easy to use.

Figure 3A:
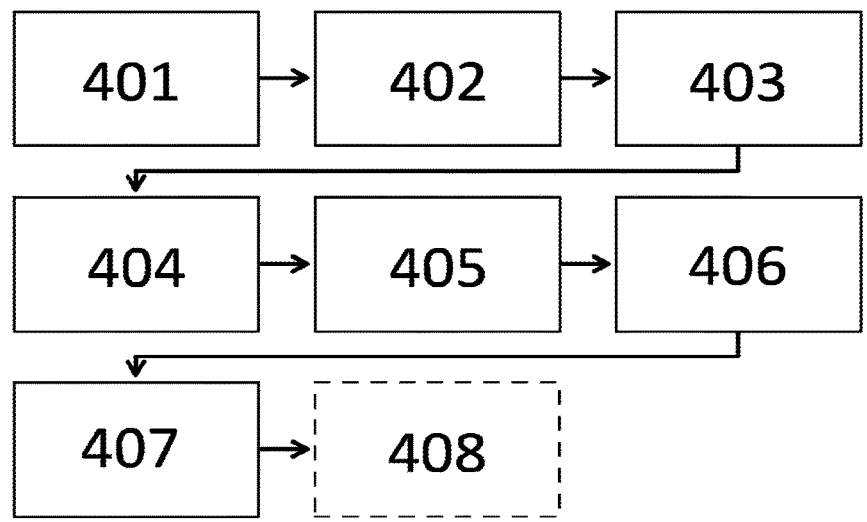
FIG. 3a shows general steps for OTP generation with OTP generating device.
Figure 3B:
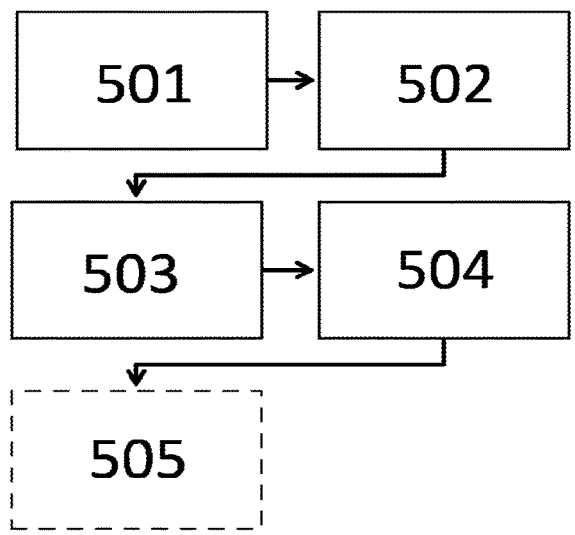
FIG. 3b shows general steps for OTP generation with a smartcard.

General steps for an OTP challenge-response device use-case are, as shown in FIG. 3a:
401. Turn on the OTP generating device 100
402. Enter PIN
403. Enter challenge, such as "amount to pay"
404. Response appears on the device display
405. Scan the device with an NFC phone
406. The device formats a pre-stored URL+identity and the challenge into an NDEF formatted URL string
407. The NFC phone 200 reads the NDEF formatted URL and navigates to this page 300
408. Optionally, the user confirms the transaction by entering a second PIN or password for this service General steps for OTP generation with smartcard, as shown in FIG. 3b:
501. Scan the smartcard with a NFC phone 200
502. A new OTP is generated internally in the smartcard
503. The smartcard formats a pre-stored URL+identity and the OTP into a NDEF formatted URL string
504. The NFC phone 200 reads the NDEF formatted URL and navigates to this page
505. Optionally, the user confirms the transaction by entering a second PIN or password for this service Optionally, the identification and OTP part can be formatted as a NDEF TEXT message rather than a NDEF URI. OTPs can then be automatically read and pasted in where needed.

Optionally, the whole or part of the code for the webpage can be stored in the URI.

In more detail the steps involved in the identification- and authentication transaction process are as follows:
1. The user turns on the OTP generating device 100 by pressing the ON button on the device keypad 107
2. The user is prompted to enter a PIN. The PIN is used to unlock the device and unless a correct PIN is given, the user cannot proceed beyond this step.
3. The user is prompted to select one of a plurality of pre-stored services displayed on the device screen 106.
4. An OATH time-based OTP (TOTP) is generated by the device, with the time reference supplied by the time keeper and the pre-stored cryptographic information associated with the selected service.
5. The resulting OTP code is displayed to the user as an 8 digit number. In this example, the OTP string is 081243123
6. A URL associated with the selected service, identifying the service location on the Internet is pre-stored in the device non-volatile memory 102 by the device issuer. In this example, a URL of a bank, https://www.acme-bank.com is the pre-stored URL.
7. A device holder identification string associated with the selected service is also stored in the device non-volatile memory 102 by the device issuer. In this example, the device holder's account number 12345678 is the pre-stored identification string.
8. The device now concatenates the URL, the identification string and the OTP into a resulting URL string, which in this example becomes https://www.acme-bank.com/?id=12345678&otp=081243123
9. The URL is reformatted into a NDEF URI record for a NDEF type 2 tag.
10. The device is now ready to be read by a NFC reader device.
11. The user scans the OTP generating device 100 using the NFC enabled cellular phone where the device identifies itself as a NDEF type 2 tag. The reader detects the presence of a NDEF URI record and retrieves it.
12. The NFC enabled cellular phone automatically invokes a web browser and uses the URI as the navigation string.
13. The receiving service acmebank.com receives the URI string and extracts the value of the id- and otp tags. The id value is used to locate cryptographic information associated with the user in a database.
14. The OTP value is verified by the server 300 and if it matches the expected value, the user is allowed to access the targeted service.
15. As a final verification step, the user may be asked to enter an additional password as a third independent factor to access the targeted service.

The device is turned off and the OTP value becomes invalidated and can then not be retrieved by a NFC reader.

This enhanced functionality allows the OTP generation device to be used in a normal setting, without NFC as well as providing the ability to be quickly and conveniently scanned by for example a NFC enabled cellular telephone. In that case, the user will be automatically connected, identified and authenticated in one simple step.

In addition to the described embodiment, the keypad 107 and display 106 can be used to authenticate further steps in the transaction process being performed. One example where a user has been successfully authenticated into banking services via the steps above and then has to verify a monetary transfer amount. In order to thwart potential viruses and Trojans, the desired transaction amount can be entered using the device keypad 107. A cryptographic operation can then be performed on this input data together with pre-stored cryptographic information. The cryptographic result can then be used by the service to verify the transaction.

Assume the following example where a transaction involves performing a payment of $2000.

The steps involved would then be as
1. The user is prompted on the OTP generating device 100 to enter a transaction amount using the device keypad 107.
2. The user enters the amount 2000 and presses OK
3. A cryptographic operation, such as OCRA is performed on this supplied information, resulting in a Message Authentication Code (MAC), which in this example becomes 04711372
4. The string is formatted into a NDEF TEXT record
5. The user scans the OTP generating device 100 using the NFC enabled cellular phone where the device identifies itself as a NDEF type 2 tag. The reader detects the presence of a NDEF TEXT record and retrieves it.
6. The user can then paste in the retrieved MAC into an input field of the web browser. This information is then used by the service to verify that the transaction is authentic.

In addition to this embodiment, functionality can be provided to allow information about the transaction to be performed to be conveyed out to the device in order to give the user full confidence that the transaction to be approved is the real one.

Assume the following example where a transaction involves performing a payment of $1500 to "McCormick hardware".

The steps involved would then be:
1. At a point in the transaction where the transaction is to be completed, a descriptive text for the transaction to be performed is set to be sent to the device. In this example this could be "Transfer $1500 to McCormick hardware"
2. The user scans the device with the NFC enabled cellular phone, which then sends the pending message to the device. The device is then turned on automatically and the descriptive text appears on the screen.
3. The user is then prompted to enter the PIN to complete the transaction.
4. The device then performs a Message Authentication Function, such as HMAC-SHA1 on the supplied text and a cryptographic key stored in the device.
5. The HMAC is sent to the server for verification. If the hashing verification matches, the transaction is completed.

In a different embodiment, the device is a triple-interface off-the-shelf smartcard, such as NXP JCOP31. This embodiment obviously do not comprise a display, keypad and time-keeper, but feature an USB-interface, a ISO7816 interface as well as a NFC tag interface.

In this embodiment, the steps involved in the identification-and authentication transaction process are as follows:
1. The user scans the device using the NFC enabled cellular phone where the device identifies itself as a NDEF type 4 tag.
2. The Smartcard device holds a pre-stored applet that is capable of generating an OTP. When the reader device selects this applet, an event-based OTP (HOTP) is created. In this example, the OTP string is 092354234
3. A URL associated with the device, identifying the service location on the Internet is pre-stored in the device non-volatile memory by the device issuer. In this example, a URL of a bank, https://www.acmefinancial.com is the pre-stored URL.
4. A device holder identification string associated with the service is also stored in the device non-volatile memory by the device issuer. In this example, the device holder's employee number 23456 is the pre-stored identification string.
5. The device now concatenates the URL, the identification string and the OTP into a resulting URL string, which in this example becomes https://www.acmefinancial.com/?id=23456&otp=092354234
6. The URL is reformatted into a NDEF URI record for a NDEF type 4 tag. The resulting string is passed to the reader.
7. The NFC enabled cellular phone automatically invokes a web browser and uses the URI as the navigation string.
8. The receiving service acmefinancial.com receives the URI string and extracts the value of the id- and otp tags. The id value is used to locate cryptographic information associated with the user in a database.
9. The OTP value is verified by the server and if it matches the expected value, the user is allowed to access the targeted service.

Figure 4:
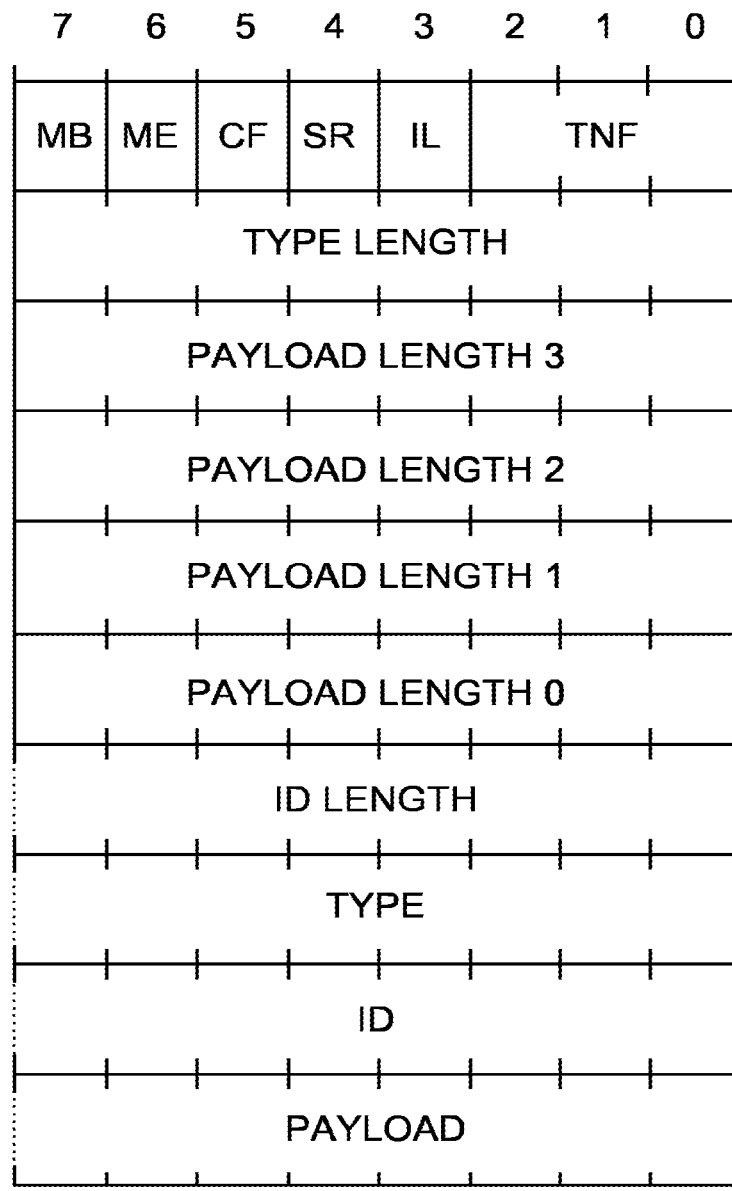
FIG. 4 shows details of the NFC message.

FIG. 4 shows details of an NDEF message and how the URL is coded as an URI in an NDEF record. The NDEF message can consist of an unlimited number of records. The NDEF standard explains the use of the control bits MB, ME, CF, SR and IL. TNF is a 3 bit field, and when binary coded to the value 3, this indicates that the payload is an absolute URI. The Type, Payload and length fields are used to define the length of those fields. The ID holds a value in the form of a unique URI reference described in RFC 3986 [RFC 3986]. The Payload field holds the URI.

In an example embodiment the OTP generating device 100 is used with a smartphone 200 using the Android operative system is used to communicate with the service server 300.

The OTP generating device 100 is a YubiKey NEO from Yubico Inc. The YubiKey NEO emits NDEF Type 2 tags containing ever-changing OTPs. The YubiKey NEO also has a USB connector.

The two major modes of operation for the YubiKey NEO with Android smartphones are Out of the box—The NFC tag emitted by default will bring up the phone's browser and access an URL containing the OTP. This URL might be a direct access URL for a specific service or a service provider/relying party in an identity federation. By default, the URL will take the user to a landing site hosted by Yubico.

With an installed application (App)—An installed application can register an "intent", which is a programmatic entity letting the application intercept the NFC tag and handle it any way it wants. The intent can be registered as matching a specific URL (in case service specific YubiKey NEOs are used). For an application to work seamlessly with as many YubiKey NEOs as possible, the application should register an interest in the default Yubico landing site URL, possibly in addition to one specific for the application. If more than one installed application registers interest in the default Yubico landing site URL, the user will be prompted for which application to use when swiping the YubiKey NEO.

The applications file AndroidManifest.xml should include the following to get access to NFC tags:

A minimum SDK version of 10 to have NFC API's: °<uses-sdk android:minsdkversion="10">

Permission to use NFC: °<uses-permission android:name="android.permission.NFC">

If NFC is a requirement for using the App: °<uses-feature android:name="android.hardware.nfc">

For working with NFC there are two choices, foreground intent dispatch or global intent dispatch.

To register globally and launch an app when presenting the YubiKey NEC programmed with the demo.yubico.com URI the following should be in the apps AndroidManifest.xml:

```
<activity android:name=".NdefActivity">
    <intent-filter>
        <action android:name=
        "android.nfc.action.NDEF_DISCOVERED"/>
        <category android:name="android.intent.category.DEFAULT"/>
        <data android:host="demo.yubico.com" android:scheme="http"/>
    </intent-filter>
</activity>
```

The application will then be called in the onResume( ) function and can get the NDEF intent by getIntent( ).

To register for foreground dispatch with any YubiKey NEO with the http URI scheme configured the relevant activity should have the following to register an IntentFilter:

PendingIntent pendingIntent=PendingIntent.getActivity (this, 0, new Intent(this, getClass( )).addFlags(Intent-.FLAG_ACTIVITY_SINGLE_TOP), 0);
IntentFilter ndef=new IntentFilter(NfcAdapter.ACTION_NDEF_DISCOVERED);
ndef.addDataScheme ("http");
NfcAdapter.getDefaultAdapter(this).enableForegroundDispatch(this, pendingIntent, new IntentFilter[ ] {ndef}, null);

The application will then be called in onNewIntent(Intent intent) when the device receives NFC data.

When NFC is no longer required, or in onPause( ), the app should disable foreground dispatch:

NfcAdapter.getDefaultAdapter(this).disableForegroundDispatch(this);

When the application has received an intent with a NDEF message, the Yubico OTP (public id+OTP) will be the last 44 characters, assuming a standard configuration with 12 characters of public id and 32 characters of OTP. You can get just the Yubico OTP from the intent with the following function:

```
private String getOtpFromIntent(Intent intent) {
    Pattern otpPattern = Pattern.compile("^.* ([cbdefghijklnrtuv]{44})$");
    String data = intent.getDataString( );
    Matcher matcher = otpPattern.matches (data);
    if (matcher.matches( )) {
        return matcher.group(1);
    } else {
        return null;
    }
}
```

An example implementation of an app using Java code on the smartphone 200 is shown in FIG. 5. The complete code develops an app that will open the webpage http://demo.yubico.com/php-yubico/one_factor.php? With the addition key=OTP, located on the server 300, where the OTP has been generated by the OTP generating device 100.

All other information needed for implementing an app on the Android platform can be found on the documentation for Android. Similar information can be found for other operating systems such as iOS, Windows and Symbian.

It should be obvious that the present embodiments do not limit the usage of OTPs to the NDEF setting only. This setting can co-exist with a more advanced interface, providing additional functionality for identification and authentication.

In another second aspect embodiment, the device comprises in addition to an NFC interface, a cryptographic processor and a graphic display, such as an LCD display, all integrated in a sealed key fob, where the sealing can be for example hermetically, waterproof or dustproof, the key fob fitting on a typical keychain. When placed in proximity with an NFC interrogator, the device harvest energy from the electromagnetic field to power the device electronics and the LCD display. A text or graphic bitmap identifying a transaction to be approved is transferred over the NFC interface and is then displayed on the LCD screen in full without formatting or interpretation. By pressing an acknowledge button, the supplied message is compressed and "signed" using a simple message authentication algorithm, such as HMAC-SHA1, using a secret key stored in the device. The HMAC is then transferred back to the requesting application using the NFC interface.

Figures 5A, 5B, 5C:
FIGS. 5a, b and c shows examples of signature displays.

FIGS. 5*a*, *b* and *c* shows examples of such displays. FIG. 5*a* shows strings of text that request confirmation (signature) for a monetary transaction. When a key or button is pressed to confirm this, the text is hashed together with an OTP generated by the OTP generating device 100 and the result is sent across the NFC interface to the NFC reader 200 and from there to the server 300 of the service requesting the signature, as shown in FIG. 3. In FIG. 5*b* the transaction is logging in to a private network, and the text is hashed and sent the same way. In FIG. 5*c* the display includes a bitmap of the user's signature and the bank's logo. Here the bitmap is hashed together with the OTP.

Integral to the concept is to have a predefined set of mnemonics, identifying the type of transaction to be performed, such as login, payment, document signing, network access, service access etc. This type identifier should be supplied with the supplied information to inform the user in what context the transaction is valid. This prevents a fraudulent setting from fooling a user to approve a transaction in a different context than it is valid for. Furthermore, the supplied information should include a timestamp and a sequence number to give it a limited and defined life span. Alternatively, this information can be added by the device itself, but then in case of the timestamp, an internal real-time clock is required.

In order to get a smooth operation, the device can be fitted with a super capacitor or battery, which allows it to be out of the NFC field for a limited amount of time. The user can then review the information on the screen and restore the device into the field to complete the transaction. Depending on the user preference, a button to accept or reject the transaction can be used or alternatively, just reinserting the device in the field can be seen as an implicit action, then automatically approving the transaction.

In an alternative embodiment, the device has the shape of a credit-card to allow it to be conveniently carried in a wallet rather than in a key chain.

In a more advanced embodiment, the device could comprise a full keypad to allow entry of additional information to be included into the cryptographic operation. The keypad could furthermore be used to enter a secret PIN to enable the device for operation.

In a different embodiment, the device comprises a speaker. Then, visually impaired users can get a short spoken message, e.g. a low quality message, to approve. If acknowledged, the binary representation of the message is signed just like with a readable message.

According to the second aspect, there is a small self-contained OTP generating device 100 featuring a display 106, a contactless interface 104 and a cryptographic processor, either separately or as part of the microprocessor 101, as shown in FIG. 1. This aspect relates to a device and method where the established infrastructure of static RFID tags is used to provide functionality for identification and authentication.

Figure 6:
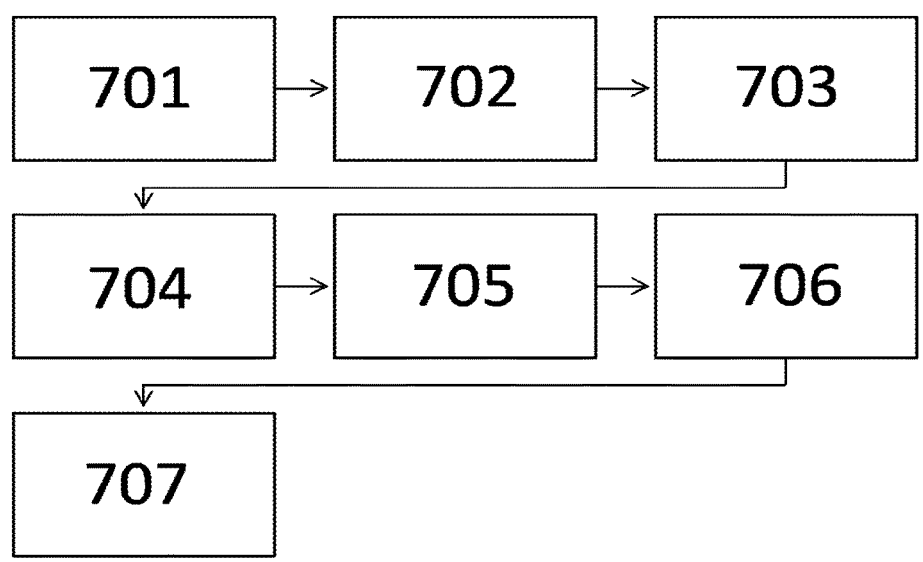
FIG. 6 shows general steps for signing.

The device is capable of performing the following steps, as shown in FIG. 6:

701. The OTP generating device 100 receives a piece of arbitrary data (e.g. text, numerical digits, timestamp, barcode, bitmap, logotype, handwritten signature etc.) that identifies a transaction to be approved by the holder of the device. The information typically originates from a host application (of a service provider) running remotely in a network setting.
702. The complete information is displayed on the screen 106 of the device
703. The user reads the information in the presented representation and determines if the information is conformant with the transaction to be completed.
704. The user acknowledges that the transaction shall be accepted, e.g. by use of a button or a keypad 107
705. The received information passes through a one-way compression (hashing) algorithm. The fixed length result is then signed using a suitable digital signature generation, for example that of the first aspect—or by message authentication algorithm using a secret cryptographic key.
706. The result is sent back from the device and is routed back to the host application.
707. The host application verifies the cryptographic result to determine if the transaction is authentic and therefore shall be approved or rejected.

The coding can be done in the same way as shown in FIG. 4, or can in a similar way follow the NFC Signature Record Type Definition (RTD) Technical Specification.

It should be obvious that the cryptographic operation described above could involve more advanced schemes than simple hashing and MAC operations. State-of-the-art symmetric and asymmetric schemes could add additional benefits to provide qualified digital signatures.

As a further illustration, here now follows a list of embodiments as clauses with roman numerals.

i. A Near Field Communication (NFC) tag device used in an authentication process between a device holder and a service over the Internet, said device featuring components to create a user identification string, identifying said user and a location identification string uniquely identifying said service as well as a time-variant authentication code being the result of a cryptographic operation on a time-variant property and a cryptographic key associated with said device holder.
ii. A device in accordance with clause i, where said device features display and input devices to allow the device holder to review and input additional reference data required to complete said transaction process
iii. A device in accordance with clause ii, where said input reference data is a Personal Identification Number (PIN)
iv. A device in accordance with clause ii, where said reference data is used as a factor in said cryptographic operation.
v. A device in accordance with clause i, where said device is a ISO7816 smart card.
vi. A device in accordance with clause i or v where said device also features a Universal Serial Bus (USB) interface
vii. A device in accordance with clause i where said identification string is formatted into a NFC Data Exchange Format (NDEF) message
viii. A device in accordance with any of the preceding clauses, featuring a device to receive transaction related information via the NFC interface.
ix. A device in accordance with clause ii and vii, featuring a display arranged to display at least parts of said transaction related information on the device display.
x. A device in accordance with clause vii where said transaction related information is at least partially included as input to said cryptographic operation.

Here now follows an example of computer readable Java code for implementation on an Android smart phone.

```
/* Copyright (c) 2012, Yubico AB. All rights reserved.*/
package com.yubico.demo;
import java.util.regex.Matcher;
import java.util.regex.Pattern;
import android.app.Activity;
import android.app.AlertDialog;
import android.app.PendingIntent;
import android.content.Context;
import android.content.DialogInterface;
import android.content.Intent;
```

```
import android.content.IntentFilter;
import android.net.Uri;
import android.nfc.NfcAdapter;
import android.os.Bundle;
import android.text.ClipboardManager;
import android.util.Log;
import android.view.ContextMenu;
import android.view.ContextMenu.ContextMenuInfo;
import android.view.MenuItem;
import android.view.View;
import android.widget.TextView;
import android.widget.Toast;
import com.yubico.client.v2.YubicoClient;
import com.yubico.client.v2.YubicoResponse;
import com.yubico.client.v2.exceptions.YubicoValidationException;
import com.yubico.client.v2.exceptions.YubicoValidationFailure;
public class YubiKeyNEOActivity extends Activity {
    private static final String logName = "YubiKeyNEOActivity";
    // compile a pattern that matches a 44 characters modhex at the end of the tag
    private static final Pattern otpPattern =
    Pattern.compile("^.*([cbdefghijklnrtuv]{44})$"};
    private String otp = null;
    private static final int COPY_TO_CLIPBOARD = 0;
    private static final int SHOW_OTP = 1;
    private static final int YUBIKEY_DEMO = 2;
    private static final int YUBICLOUD_VERIFY = 3;
        // client id and key from https://upgrade.yubico.com/getapikey/, get your own
        private static final int CLIENT_ID = 7392;
        private static final String CLIENT_KEY =
"CQLk127pz8dhtjAis5ErwTR2KoM=";
        /** Called when the activity is first created. */
        @Override
        public void onCreate(Bundle savedInstanceState) {
        super.onCreate(savedInstanceState) ;
        setContentView(R.layout.main);
    }
    public void onPause( ) {
        super.onPause( );
        // disable foreground dispatch when we're paused
NfcAdapter.getDefaultAdapter(this).disableForegroundDispatch(this);
    }
    public void onResume( ) {
        super.onResume( );
PendingIntent pendingIntent = PendingIntent.getActivity (
        this, 0, new Intent(this,
getClass( )).addFlags(Intent.FLAG_ACTIVITY_SINGLE_TOP), 0);
        // register for all NDEF tags starting with http och https
        IntentFilter ndef = new
IntentFilter(NfcAdapter.ACTION_NDEF_DISCOVERED);
        ndef.addDataScheme("http");
        ndef.addDataScheme("https");
        // register for foreground dispatch so we'll receive tags according to our intent
        filters
        NfcAdapter.getDefaultAdapter(this).enableForegroundDispatch(
            this, pendingIntent, new IntentFilter[ ] {ndef}, null);
    }
    public void onNewIntent(Intent intent) {
    // get the actual URI from the ndef tag
    String data = intent.getDataString( );
        Log.d(logName, "data: " + data);
        Matcher matcher = otpPattern.matcher(data);
        if (matcher.matches( )) {
            // if the otp matched our regex open up a contextmenu
            otp = matcher.group(1);
            View view = findViewById(R.id.text1);
            registerForContextMenu(view);
            this.openContextMenu(view);
    } else {
    Toast.makeText (this, R.string.no_neo, Toast.LENGTH_SHORT);
        }
        @Override
        public void onCreateContextMenu(ContextMenu menu, View v,
                ContextMenuInfo menuInfo) {
            menu.setHeaderTitle(R.string.otp_received);
            menu.setHeaderIcon(R.drawable.yubikey);
            menu.add(0, COPY_TO_CLIPBOARD, 0, R.string.copy_to_clipboard);
            menu.add(0, SHOW_OTP, 1, R.string.show_otp);
            menu.add(0, YUBIKEY_DEMO, 2, R.string.yubikey_demo);
            menu.add(0, YUBICLOUD_VERIFY, 3, R.string.yubicloud_verify);
```

```
}
@Override
public boolean onContextItemSelected(MenuItem item) {
    switch(item.getItemId( )) {
    case COPY_TO_CLIPBOARD: // copy the OTP to clipboard
        ClipboardManager clipboard = (ClipboardManager)
this.getSystemService(Context.CLIPBOARD_SERVICE);
        clipboard.setText(otp);
        Toast.makeText(this, R.string.copied_to_clipboard,
Toast.LENGTH_SHORT).show( );
        break;
    case SHOW_OTP: // show a dialog with the OTP displayed
        showOTPDialog(otp);
        break;
    case YUBIKEY_DEMO: // start an intent for the browser with the
yubico demo site + the OTP
        String url = "http://demo.yubico.com/php-
yubico/one_factor.php?key=" + otp;
        Intent i = new Intent(Intent.ACTION_VIEW);
        i.setData(Uri.parse(url));
        i.setFlags(Intent.FLAG_ACTIVITY_NEW_TASK);
        startActivity(i);
        break;
    case YUBICLOUD_VERIFY: // do verification of the OTP to the YubiCloud
        platform directly
YubicoClient client = YubicoClient.getClient(CLIENT_ID);
    // key is used for signing and verifying request/response,
you should use your own.
        client.setKey(CLIENT_KEY);
        try {
            YubicoResponse response = client.verify(otp);
            showCloudDialog(response);
        } catch (YubicoValidationException e) {
            Toast.makeText (this, "Validation failed: " +
e.getMessage( ), Toast.LENGTH_LONG);
        } catch (YubicoValidationFailure e) {
            Toast.makeText(this, "Failure in validating response: "
+ e.getMessage( ), Toast.LENGTH_LONG);
        }
        break;
        }
        return false;
    }
    private void showCloudDialog(YubicoResponse response) {
        // build a dialog from the cloud display view, displaying data
    from the YubiCloud response
        AlertDialog.Builder alert = new AlertDialog.Builder(this);
        View display = View.inflate(this, R.layout.cloud_display, null);
        ((TextView)
display.findViewById(R.id.status1)).setText(response.getStatus( ).toString( )
);
        if(response.getOtp( ) != null) {
            TextView otp_view = (TextView)
display.findViewById(R.id.otp1);
            otp_view.setText(formatOTP(otp));
        }
        if(response.getSessioncounter( ) != null) {
            // display the sessionCounter returned
            ((TextView)
display.findViewById(R.id.counter1)).setText(response.getSessioncounter( ) ) ;
        }
        if (response.getS1( ) != null) {
            // display achieved sync percentage
            ((TextView)
display.findViewById(R.id.sync1)).setText(response.getS1( ) + "%");
        }
        alert.setView(display);
        alert.setPositiveButton(R.string.ok, new
DialogInterface.OnClickListener( ) {
    public void onClick(DialogInterface dialog,
        int whichButton) {
            dialog.cancel( );
        }
    });
    alert.show( );
} private void showOTPDialog(String otp) {
        AlertDialog.Builder alert = new AlertDialog.Builder(this);
        // Set an EditText view to get user input
```

```
        final TextView input = (TextView) TextView.inflate(this,
            R.layout.otp_display, null);
        input.setText(formatOTP(otp));
        alert.setView(input);
        alert.setPositiveButton(R.string.ok, new
    DialogInterface.OnClickListener( ) {
        public void onClick(DialogInterface dialog,
                int whichButton) {
            dialog.cancel( );
        }
    });
    alert.show( );
}
    private String formatOTP(String otp) {
        String displayOTP = new String( );
        for (int i = 0; i < otp.length( );) {
            if (i == 12 || i == 26) {
                displayOTP += otp.substring(i, i + 2) + " ";
                i += 2;
            } else {
                displayOTP += otp.substring(i, i + 4);
                if (i != 40)
                    displayOTP += " ";
                i += 4;
            }
        }
        return displayOTP;
    }
}
```

The invention claimed is:

1. A method for generating a one time password (OTP), the method comprising:
responsive to a OTP generating device being inserted into an activation Radio Frequency (RF) field associated with a RF reader, generating a new OTP using a cryptographic key, the new OTP being variant from other OTPs generated by the OTP generating device;
formatting a static message, the static message comprising the new OTP and a fixed Uniform Resource Locator (URL), where the static message is formatted with a variant OTP each time the OTP generating device is inserted into the activation RF field;
storing the static message in a memory of the OTP generating device;
retrieving the static message from the memory responsive to a read request from the RF reader associated with the RF field; and
providing the retrieved static message to the RF reader.

2. The method according to claim 1, wherein formatting the static message comprises generating a static message formatted in accordance with a Near Field Communication (NFC) Data Exchange Format.

3. The method according to claim 1, wherein generating the new OTP comprises using open authentication (OATH) according to request for comments (RFC) 4226.

4. The method according to claim 1, further comprising:
receiving input from a user comprising a Personal Identification Number (PIN), the PIN used to verify whether the user is a legitimate owner of the OTP generating device;
responsive to the user being verified as a legitimate owner based on the PIN, receiving a user input comprising a challenge; and
presenting the generated OTP on a display of the OTP generating device responsive to receiving the user input comprising the challenge.

5. The method according to claim 1, further comprising:
receiving identification data identifying a transaction;
receiving input from a user indicating approval of the transaction;
processing the identification data through a one-way compression algorithm resulting in a token responsive to receiving the user input indicating approval;
digitally signing the token; and
sending the signed token to the RF reader.

6. The method according to claim 5, further comprising: presenting the identification data to the user.

7. A one time password (OTP) generating device comprising:
a processor for executing computer program code; and
a non-transitory computer-readable medium storing computer program code executable by the processor to perform steps comprising:
responsive to the OTP generating device being inserted into an activation Radio Frequency (RF) field associated with a RF reader, generating a new OTP using a cryptographic key, the new OTP being variant from other OTPs generated by the OTP generating device;
formatting a static message, the static message comprising the new OTP and a fixed Uniform Resource Locator (URL), where the static message is formatted with a variant OTP each time the OTP generating device is inserted into the activation RF field;
storing the static message in a memory of the OTP generating device;
retrieving the static message from the memory responsive to a read request from the RF reader associated with the RF field; and
providing the retrieved static message to the RF reader.

8. The OTP generating device according to claim 7, wherein the OTP generating device is a computing device comprising a display.

9. The OTP generating device according to claim 7, wherein the OTP generating device is a computing device comprising a keyboard.

10. The OTP generating device according to claim 7, wherein the OTP generating device is one of a Universal Serial Bus (USB) key fob or a smartcard supporting both a contact interface and a Near Field Communication (NFC) / Radio Frequency Identification (RFID) interface.

11. The OTP generating device according to claim 7, wherein the OTP generating device is a mobile telephone comprising an integral NFC/RFID interface, working in a tag emulation mode.

12. The OTP generating device according to claim 11, wherein the NFC/RFID interface is compatible with NFC forum type 2 tag specification.

13. The OTP generating device according to claim 7, the steps further comprising:
  receiving identification data identifying a transaction;
  receiving user input indicating approval of the transaction;
  processing the identification data through a one-way compression algorithm resulting in a token responsive to receiving the user input indicating approval;
  digitally signing the token; and
  sending the signed token to the RF reader.

14. The OTP generating device according to claim 13, the steps further comprising:
  presenting the identification data to the user.

15. The OTP generating device according to claim 7, wherein formatting the static message comprises generating a static message formatted in accordance with a Near Field Communication (NFC) Data Exchange Format.

16. A non-transitory computer-readable storage medium storing executable computer program instructions for generating a one time password (OTP), the computer program instructions comprising instructions for:
  responsive to a OTP generating device being inserted into an activation Radio Frequency (RF) field associated with a RF reader, generating a new OTP using a cryptographic key, the new OTP being variant from other OTPs generated by the OTP generating device;
  formatting a static message, the static message comprising the new OTP and a fixed Uniform Resource Locator (URL), where the static message is formatted with a variant OTP each time the OTP generating device is inserted into the activation RF field;
  storing the static message in a memory of the OTP generating device;
  retrieving the static message from the memory responsive to a read request from the RF reader associated with the RF field; and
  providing the retrieved static message to the RF reader.

17. The computer-readable storage medium according to claim 16, further comprising computer program instructions for:
  receiving input from a user comprising a Personal Identification Number (PIN), the PIN used to verify whether the user is a legitimate owner of the OTP generating device;
  responsive to the user being verified as a legitimate owner based on the PIN, receiving a user input comprising a challenge; and
  presenting the generated OTP on a display of the OTP generating device responsive to receiving the user input comprising the challenge.

18. The computer-readable storage medium according to claim 16, further comprising computer program instructions for:
  receiving identification data identifying a transaction;
  receiving input from a user indicating approval of the transaction;
  processing the identification data through a one-way compression algorithm resulting in a token responsive to receiving the user input indicating approval;
  digitally signing the token; and
  sending the signed token to the RF reader.

19. The computer-readable storage medium according to claim 18, further comprising computer program instructions for:
  presenting the identification data to the user.

20. The computer-readable storage medium according to claim 16, wherein formatting the static message comprises generating a static message formatted in accordance with a Near Field Communication (NFC) Data Exchange Format.

* * * * *